US008307404B2

(12) United States Patent  (10) Patent No.: US 8,307,404 B2
Vinberg et al.  (45) Date of Patent: Nov. 6, 2012

(54) POLICY-MANAGEMENT INFRASTRUCTURE

(75) Inventors: Anders B. Vinberg, Kirkland, WA (US); Mazhar Naveed Mohammed, Sammamish, WA (US); Steven P Burns, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 11/735,800

(22) Filed: Apr. 16, 2007

(65) Prior Publication Data

US 2008/0256593 A1  Oct. 16, 2008

(51) Int. Cl.
*G06F 17/00* (2006.01)

(52) U.S. Cl. .......................................... 726/1
(58) Field of Classification Search ........................ 726/1
See application file for complete search history.

(56) References Cited

U.S. PATENT DOCUMENTS

| 6,081,898 | A * | 6/2000 | Miller et al. ........................ 726/1 |
| 6,941,471 | B2 | 9/2005 | Lin |
| 2002/0095524 | A1 * | 7/2002 | Sanghvi et al. ............... 709/318 |
| 2003/0023880 | A1 | 1/2003 | Edwards et al. |
| 2003/0110192 | A1 | 6/2003 | Valente et al. |
| 2004/0039942 | A1 | 2/2004 | Cooper et al. |
| 2004/0117407 | A1 * | 6/2004 | Kumar et al. ................. 707/200 |
| 2005/0055565 | A1 * | 3/2005 | Fournet et al. ................. 713/200 |
| 2005/0198050 | A1 | 9/2005 | Bivens, II et al. |
| 2005/0234942 | A1 | 10/2005 | McCauley et al. |
| 2006/0036570 | A1 | 2/2006 | Schaefer et al. |
| 2006/0053215 | A1 | 3/2006 | Sharma |
| 2006/0080667 | A1 | 4/2006 | Sanghvi et al. |
| 2006/0089938 | A1 | 4/2006 | Leonard et al. |
| 2006/0294577 | A1 * | 12/2006 | Gouda et al. ........................ 726/1 |
| 2008/0126287 | A1 * | 5/2008 | Cox et al. ........................ 706/48 |

FOREIGN PATENT DOCUMENTS

WO  WO03102762  12/2003

OTHER PUBLICATIONS

Damiani et al., "Extending Policy Languages to the Semantic Web", 14 pages.
Dulay et al., "A Policy Language for the Management of Distributed Agents", LNCS 2222, AOSE 2001, 2002, pp. 84-100.
Kagal et al., "A Policy Language for a Pervasive Computing Environment", Proceedings of the 4th International Workshop on Policies for Distributed Systems and Networks, IEEE, 2003, 12 pages.
Kaushik et al., "Policy-Based Dissemination of Partial Web-Ontologies", SWS, ACM, Nov. 11, 2005, pp. 43-52.
Lin, A., "Integrating Policy-Driven Role Based Access Control with the Common Data Security Architecture", Hewlett-Packard Company, 1999, 15 pages.
Translated Chinese Office Action mailed Mar. 15, 2011 for Chinese Patent Application No. 200880011871.6, a counterpart foreign application of U.S. Appl. No. 11/735,800.

(Continued)

*Primary Examiner* — Cordelia Zecher
(74) *Attorney, Agent, or Firm* — Lee & Hayes, PLLC

(57) ABSTRACT

Described herein are one or more implementations of a policy-management infrastructure that provides a universal policy-based solution across a spectrum of scenarios in a computing environment. At least one implementation of the policy-management infrastructure defines how policy-based data is structured or layered relative towards the data in other layers. Furthermore, a described implementation provides a mechanism for determining "overlap" and "conflicts" in policies.

20 Claims, 2 Drawing Sheets

OTHER PUBLICATIONS

The European Office Action mailed Nov. 17, 2011 for European patent application No. 08744152.3, a counterpart foreign application of U.S. Appl. No. 11/735,800, 4 pages.

The Chinese Office Action mailed Feb. 28, 2012 for Chinese patent application No. 200880011871.6, a counterpart foreign application of U.S. Appl. No. 11/735,800, 9 pages.

* cited by examiner

POLICY-MANAGEMENT INFRASTRUCTURE

BACKGROUND

A computing enterprise typically includes various computing components that interact with one another. Such computing components may include one or more networks, applications, services, and systems. In a computing enterprise, policies are often implemented to manage and control individual components and groups of multiple components. For example, network security policies are often employed to restrict access that one system has to another system.

In some instances, policies indirectly manage and control a person, at least with regard to that person's interaction with individual or groups of multiple computing components. For example, a security policy may be associated with a particular user so that such user has access to the same systems and data regardless of the system from which she uses to gain access.

Unless the context herein indicates otherwise, a "policy" should be understood herein to refer to a declarative description of how a computing component (or a group of multiple components) should be or behave. A policy is not a procedural list of instructions. Moreover, a "policy" may be understood herein to be a predicate of the state of one or more components and/or a predicate of the behavior of one or more components. Furthermore, a "policy" dedicates actions performed by one or more components. In general, a policy speaks of the thing that is to-be-managed.

Policy-based solutions are often central to managing complexity, scale and dynamics in a computing enterprise. However, conventional policy-based approaches are insufficiently rich and fragmented across the spectrum of particular scenarios found in various the computing enterprises. Examples of typical scenarios include deployment, security, network and storage management.

No universal policy language exists. Typically, each particular scenario (e.g., data protection or firewall) has its own policy-based solution with its own specialized policy language, syntax, semantics, policy-creation user-interface, and peculiarities.

As of today, no universal policy-based solution exists that supports all of the requirements for overall management of the spectrum of scenarios found in various the computing enterprises.

SUMMARY

Described herein are one or more implementations of a policy-management infrastructure that provides a universal policy-based solution across a spectrum of scenarios in a computing environment. At least one implementation of the policy-management infrastructure defines how policy-based data is structured or layered relative towards the data in other layers. Furthermore, a described implementation provides a mechanism for determining "overlap" and "conflicts" in policies.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like elements and features.

DETAILED DESCRIPTION

Figure 1:
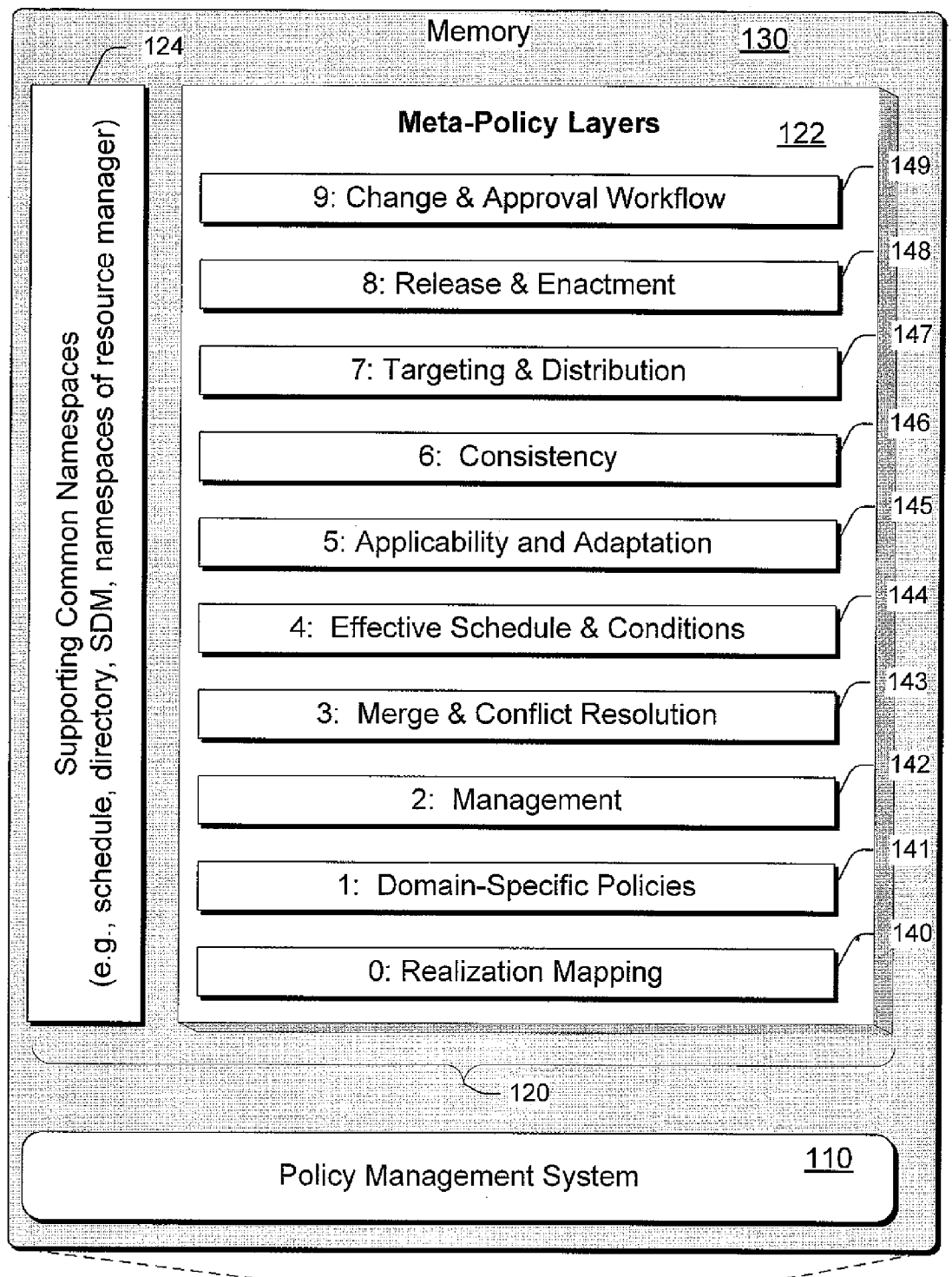
FIG. 1 is an exemplary scenario that supports one or more implementations of a policy-management infrastructure described herein. This drawing also shows the logical organization of the policy-management infrastructure.
Figure 1:
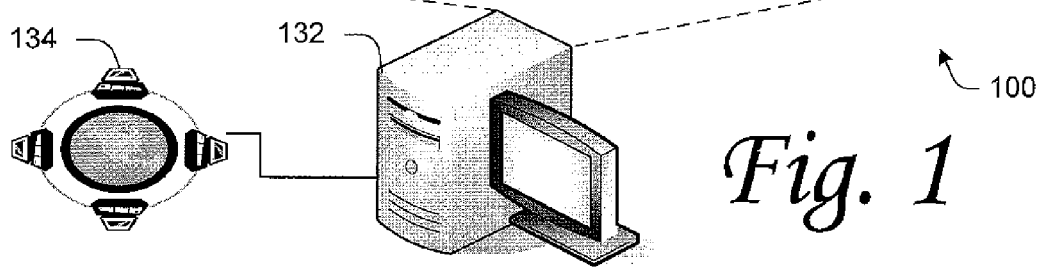

In a typical scenario, a policy is targeted at a service (or more strictly, a model of that service), and the subject policy is applied and adapted to the various systems that make up the service. Despite changes or attempted changes made directly to the target system, the policy is applied and adapted to the target system so that the system conforms to the subject policy or so that any variance from the subject policy is determined. However, there are many different types of policy-based solutions for various scenarios under which the solutions may be applied.

One or more implementations are described herein for a universal policy-based solution that supports all of the requirements for overall management across the spectrum of scenarios found in various the computing enterprises. The universal policy-based solution described herein provides a policy-management infrastructure for defining how policy-based data is structured or layered relative towards the data in other layers.

In general, this policy-management infrastructure (i.e., architecture) utilizes aspects of policies that are common and are shared across domains. More particularly, the infrastructure utilizes some typical namespaces that are commonly referenced by the many and various policies. These policies are employed in differing scenarios, such as the following (by way of example and not limitation):

Software deployment
Patching
Configuration management
Vulnerability assessment
Data protection (backup)
Data retention
Authentication
Authorization
Auditing
Information protection (DRM)
Intrusion detection
Intrusion prevention
Anti-malware
Firewall
Network access protection
Health monitoring
Service level monitoring
Load balancing
Inventory
License management
Usage metering
Context sharing over isolation boundaries
Task and job execution
Disaster recovery
Workload management
Resource management
On-demand resource allocation
Power and cooling management
Change management and workflow
Distribution and release management This policy-management infrastructure is not a universal policy language. Rather, the infrastructure rationalizes the existing domain-specific policy-based solutions and works in cooperation with such solutions for each particular scenario (e.g., data protection or firewall). This rationalization is accomplished, at least in part, by the infrastructure utilizing identified common namespaces and by defining universal meta-policies.

A meta-policy controls the behavior of policies. A meta-policy is a declarative description of how, when, and where one or more policies should be applied and managed. In short, a meta-policy is a policy of policies.

Terminology herein: a system is one or more computing components; a model describes a system, its components and their relationships; a policy says how that system is to look and behave; policies are applied to models, and thence to real-world systems; a meta-policy describes how policies are applied and managed.

Policy Management Infrastructure

FIG. 1 illustrates the arrangements of a policy-management infrastructure 100 in accordance with one or more implementations described herein. It includes a policy-management system 110 and a policy-management data model 120 comprising several layers of meta-policies 122 and associated supporting common namespaces 124. The policy-management system 110 is one or more program modules executing the logic for policy management based upon the policy-management infrastructure 100 described herein. The policy-management data model 120 defines the organization of and the relationship of data within the policy-management infrastructure 100 described herein.

As depicted, policy-management system 110 and the policy management data model 120 are stored and/or processed within a memory 130 of a computer 132. The computer 132 typically includes a variety of processor-readable media (including the memory 130). Such media may be any available media that is accessible by the computer 132 and includes both volatile and non-volatile media, removable and non-removable media. The computer 132 may be connected to one or more other network computers 134. These network computers may be target nodes of a policy.

Using the policy-management infrastructure 100, the policy-management system 110 reasons over polices, for several purposes. For example, a conflict between policies is a common situation where reasoning is necessary. For example, if Alice says firewalls are up and Bob the super-admin says firewalls are down and those policies apply to the same system at the same time, the policy-management system 110 (using the policy-management infrastructure) detects the conflict and notifies Alice that her policy is overridden. And vice versa, if Alice's policy is in effect and Bob puts a policy in effect, Bob should be told what he has done to Alice.

Verifying coverage is another good purpose for the policy-management system 110 to reason over polices. With the infrastructure, the policy-management system 110 may be verified that the policy in effect for each resource at every time. Impact analysis is another good purpose for the policy-management system 110 to reason over polices. If one makes a policy change, the infrastructure can help determine which systems are affected. For example, if one changes a security policy that is tied into quarantine, how many users will be unable to log into the internal corporate network tomorrow morning? How many of those are vice presidents?

Meta-Policies Layers

As depicted, the policy-management data model 120 includes, for example, ten hierarchically ordered and layered meta-policies (listed from the bottom to the top layer):

Layer 0: Realization Mapping 140
Layer 1: Domain-Specific Policies 141
Layer 2: Management 142
Layer 3: Merge & Conflict Resolution 143
Layer 4: Effective Schedule & Conditions 144
Layer 5: Applicability & Adaptation 145
Layer 6: Consistency 146
Layer 7: Targeting & Distribution 147
Layer 8: Release & Enactment 148
Layer 9: Change & Approval Workflow 149

The basis for the layer ordering is that the meta-policy in one layer can influence just the meta-policies in the lower-numbered layers. For example, once targeting (i.e., layer 7) is done, it is known that the policy applies to a specific set of computers. (Here, "applies" means that one common style of targeting applies, not the only one is possible.) With this information, the policy management system evaluates, on those computers only, the applicability meta-policy (i.e., layer 5) to determine if the policy applies to those computers, for example, because they have a certain piece of software installed. The benefits of this ordering include (but is not limited to) the following:

Efficiency of processing: In the example above, the targeting reduces the number of computers for which applicability must be evaluated; targeting can typically be determined efficiently based on information in centralized databases and directories, while applicability typically requires visiting each computer. Similarly, effective schedule and conditions (i.e., layer 4) must typically be evaluated continuously on each computer, since computers are mobile and the conditions vary as computers are connected to various networks and devices, and as time progresses; typically, this evaluation is done on the targeted computers, and only if the policy is applicable; attempting to keep track of local time on each managed computer is obviously inefficient and would limit scalability of the policy management system.

Division of labor between server-side policy management infrastructure and local processing on the managed system: some policies can and is handled by the central infrastructure, others can and is handled on the local machine, and this division of labor requires that the policies are ordered correctly. Attempting to evaluate in a central server system the environmental conditions, such as what network the computer is connected to and what removable devices like Universal Serial Bus (USB) sticks are connected, for each targeted computer is practically impossible since computers may be intermittently disconnected. Therefore, the layers in the stack should be ordered in such a way that all policies that should be evaluated on the servers should be numbered higher than those that should be evaluated on the managed system. This concept can be generalized to multiple layers: a solution may have a central system and database where change management and enactment and release are done, under the control of meta-policies in layers 9 and 8; policies are released to a distribution infrastructure that provides geo-scale replication and high availability characteristics, and targeting (i.e., layer 7) are handled by this infrastructure; and the lower level meta-policies are handled on each managed node. Again, the correct ordering is essential to enable this allocation of processing while preserving the semantics of the meta-policies.

These benefits apply not only to the application of policy, but to analysis such as conflict and coverage. Of course, other implementation may use a different set of layers, and may order them differently to address different requirements.

Layer 0: Realization Mapping

For the policies managed by this meta-policy, each abstract concept in this layer is mapped to a realization in the actual environment. This may be done through specifications for discovery (to find out how it is currently configured) and synchronization (how to set it correct if it is not). For example, a Domain-Specific Policy (i.e., layer 1) may refer to an abstract setting called Authentication Technique, and the realization mapping (i.e., layer 0) specifies the registry key where this setting is located.

One or more implementations may employ declarative discovery and synchronization specifications and the implementations may provide a number of standard engines that can handle most common types of policy items, from setting a registry key to running an installation or deploying a virtual machine (VM). Such declarative specifications may, for example, include a specification of the software system that should receive the policy, such as the registry, combined with a Uniform Resource Identifier indicating the specific location. One or more implementations may support procedural sync and discovery, including scripting. In many cases this mapping simply describes handing the policy to a policy consumer.

One advantage of separating the physical realization from the domain specific policy is that it allows expressing the domain specific policy in an abstract way, separated from the way the affected functionality is implemented on a specific system. This means the policy can easily be adjusted to a new version of a system that has a different implementation. For example, a security policy may contain complex expressions, but when a computer system is modified in a way that locates the security-related settings in a different location, perhaps in a database instead of the registry, only the relatively simple realization meta-policy must be modified, not the complex security policy itself. It also means that people with different expertise can maintain the separate parts of a policy. For example, an expert on security may specify policies on Authentication, while a more junior staff member with little understanding of the complexities of security can edit the physical realization meta-policy when the software is versioned. It also means that a single domain-specific policy can be easily adjusted to apply to different systems with different realizations, simply by applying different realization mapping meta-policies. Of course, all these benefits apply only if the different systems or versions of systems have consistent semantics, so the domain-specific policy can meaningfully be applied.

Layer 1: Domain-Specific Policies

This layer details the specifics of the various domain-specific policies. This layer itself is not a meta-policy. It is not a policy of policies (which is the definition of a meta-policy); rather it is the one or more actual policies. In one or more implementations, the policies are schematized. As long as the specifics of each domain-specific policy are expressed, the exact manner that the specifics are expressed is an implementation detail.

Layer 2: Management

Many policies are handed to a policy consumer and consequently the policies are enforced by the policy consumer; therefore, an implementation of the policy-management infrastructure does not need to manage the policies after they are handed over to a policy consumer. Examples of policy consumers include a resource manager (e.g. access control in the file system) or a service (e.g. backup).

But some policies are not enforced because the resource manager is not policy-aware. For example, some operating systems (OSs) cannot prevent black-listed software from executing because the OSs provides no such mechanism to do so. Even if a policy is technically enforceable, it may be desirable to mark the policy as not-enforced-but-monitored because strict enforcement may be too heavy handed for a given situation. For example, when a mission-critical server goes out of configuration compliance, IT staff may prefer to investigate the cause of the change before restoring the configuration, because there may have been a valid but unknown reason for the configuration change. And in some cases, it may be desirable to temporarily disable enforcement of a policy, for example, when a system is being maintained or serviced.

Rather then just handing over the enforcement duties to the policy consumer an implementation of the policy-management infrastructure uses the data in this layer is used to explicitly manage the policies. This meta-policy defines how the effective policy is to be managed. For example, it may manage the schedule or events that trigger policy compliance validation, the response to non-compliance (e.g., corrective action, alert, report), temporarily disabling a policy for maintenance, adjust tolerance parameters.

Within the policy-management infrastructure, this meta-policy layer provides the general management sub-infrastructure on a managed node. The general management sub-infrastructure provides compliance monitoring, remediation, reporting and alerting.

Layer 3: Merge and Conflict Resolution

It is not uncommon for several policies to conflict. Sometimes multiple policies of the same management domain are in effect for the exact same resource on the same system at the same time. The following are examples of such conflicts:

- A department administrator wants the firewall down, the security administrator wants it up
- An application needs the firewall down, the security administrator wants it up
- Two applications have conflicting requirements on an OS setting
- A security policy wants to urgently make a configuration change that requires a reboot but a servicing window policy prohibits a reboot during working hours This meta-policy defines the approach for merging policies and/or resolving conflicts. Generally, this approach may be called "computing the Resultant Set of Policies (RSOP)." In the face of an apparent conflict, this meta-policy may define the resolution (or RSOP) for the apparent conflict. The following are some examples of possible resolution options:

- No need for a merge policy: this option is also used when the resource manager has a complex resolution algorithm that cannot be expressed in a general meta-policy;
- Explicit delegation: when the master administrator owns everything, that administrator explicitly delegates rights and specifies the merge policy on conflict;
- Authority of the issuer ("stripes on the shoulder"): useful when a delegation chain cannot be tracked;
- Specificity: use the policy defined at the largest scope (enterprise policy wins) or smallest scope (most specific policy wins);
- Most restrictive or least restrictive policy wins;
- Compute intersection of valid ranges or schedules (e.g. one server hosting four services, each with a servicing window, the server gets the intersection of the servicing windows);
- Alert Do not attempt to merge policies, alert the IT staff to the conflict.

This meta-policy may address other complications involved in apparent conflicts in policies. For example, the granularity of the policy merge may need resolving. A conflict may be resolved by disabling one of the complete policies. Alternatively, the system may choose a winning policy on a statement-by-statement basis.

Layer 4: Effective Schedule and Conditions

It is common that different policies are in effect at different times: for example, Human Resources (HR) staff can access the HR applications during working hours, but not at night. This meta-policy defines the effective schedule for a policy. The meta-policy defines a common schema for schedules expressed in terms of a calendar A useful enhancement is to permit compositing multiple schedules, for example by combining the 9 am-5 pm Working Hours schedule with the Working Days schedule and excluding the days in the Holidays schedule.

Many policies include conditions expressed as predicates over ambient state: for example, HR staff can access the HR applications when logged on to their corporate desktop with strong credentials (e.g., smartcards); use one default printer when a laptop is connected to the internal corporate network, but a different default printer when connected at home. Rather than use a common schema for such conditions, the conditions may be defined as logical expressions over a namespace. These conditions look like state predicates in a policy. When extracting them to this meta-policy, a generalized unit for conditions may be expressed for reuse across domain-specific policy languages. For example, by placing "strongly authenticated" in this meta-policy, all domain policies that depend on strong authentication may be identified without parsing the domain-specific languages.

Layer 5: Applicability and Adaptation

The applicability meta-policy refines targeting by deciding on which of the targeted systems the policy actually applies. For example, a SQL policy should go only on machines that have SQL. This is useful because a system administrator may target a policy to a service that contains systems of different kinds. In this situation, the management system uses the applicability meta-policy to determine where, within this heterogeneous structure, the policy applies. It also makes a policy self-adaptive. For example, a policy that is not previously in effect may become applicable when a universal serial bus (USB) device is plugged into a laptop.

This meta-policy may also supports a limited form of model adaptation. Policy selection is used when there are several related policies, e.g. one for data protection on a file server, one for a database server, one for a mail server. If those several policies are designed to be consistent and are intended to be applied together within one service, an implementation of the infrastructure may (a) define the applicability meta-policy for each policy, and/or (b) group them together into a container policy which is targeted at the service. The applicability meta-policies in aggregate define a policy adaptation meta-policy.

Model adaptation fits the model to the real world. Unrelated to the policy, a discovery service finds what instances exist on a given system and creates the proper instances and relationships in the local model. The meta-policy defines how policies are adapted to the model instances. For example, there may be more than one SQL instance on a machine, and a health monitoring policy is instantiated for each SQL instance.

Layer 6: Consistency

In common practice, systems policies are usually applied without transactional semantics, for several reasons such as:
  The systems that get the policy do not support transactions
  The policies is deployed to many computer systems in many locations, and doing distributed transactions at geo-scale is considered prohibitively difficult
  Some computer systems may be intermittently disconnected, and cannot participate in a distributed transaction because they would hold up deployment of the policy to the other computers
  There is no need for coordinated deployment, best-effort deployment on each computer system is sufficient But in some cases, the policy application needs to be done with transactional semantics, for several reasons such as:
  Several policies form an internally consistent set that must be deployed as an atomic unit, effectively at a single point in time, because incremental application would leave the system temporarily in an inconsistent state
  Several policies form an internally consistent set that must be applied all together or not at all, because partial application would leave the system in an inconsistent state
  Policy application must be a part of a transaction in another system, for example when policy specifies a change of operation in a database cluster the change may need to be coordinated with database transactions The consistency meta-policy layer specifies what consistency requirements the policy has, with options such as no consistency required, atomic application within a single computer, and coordination with transactions in another system, atomic application across several computers.

Layer 7: Targeting and Distribution

Policies are often selectively targeted to computer systems, and delivery is controlled. The following are examples of two common types of targeting:
  Administrative groups considered homogeneous ("many-as-one" management). The groups are often based on directory services, but arbitrary groupings entered from other sources are also useful, such as "inventory-based" targeting where a management tool takes inventory of the characteristics or configuration of computer systems, "enumerative targeting" where a list of computer IDs are explicitly listed, or combinations of those.
  Service models consisting of a structure of systems considered heterogeneous, and the policy is intelligently applied to each system in the service.

Targeting works in concert with applicability. If, for example, a policy applies to all systems in headquarters that have SQL, an implementation may be created so that this layer is used to target it to all systems in headquarters, and let the applicability meta-policy filter that target group down to the SQL systems. But if a policy applies to all production SQL systems, applicability rules might not be able to discover if a system is production or test, so the targeting meta-policy is used to identify the group of production systems and combined with an applicability meta-policy that filters the policy down to SQL systems.

This layer also includes distribution policy, such as "get this to the targets before 6 AM" or "refresh the policy every 6 hours and on network logon." More complex distribution policy might say "if a roaming user needs a large software package in a locale that is not available on the server where he is visiting, don't transfer the package over the long-distance network, wait until he is back in his regular location." However, this meta-policy need not include detailed distribution rules such as which distribution point server to use, bandwidth allocation or compression technique. Those are distribution details for the distribution fabric, not for the package. This meta-policy focuses on schedules, priorities and budgets.

In addition to targeting policies to computer systems, many policies are targeted to other elements: users or groups of users, software applications, data in databases or documents in a document system or mail system. At any point in time, those targeted systems exist on a computer system or otherwise under the control of a computer system; when they do not, they are not covered by computer-based policy and are outside of the scope of this invention. But it is preferable to target policies directly to the intended object rather than explicitly to the computer system, for two reasons:

The administrator can express intent directly, in terms of the user, application or document, and let the policy management system take care of the mechanical aspect of sending the policy to the right computer system or systems; this simplifies management and allows reports and analysis to be expressed in meaningful terms.

Objects like users, software applications, data and documents are often mobile, moving over a network of computer systems with temporary and tenuous relationships with those computers systems. Expressing policy targeting in terms of the intended objects allows the policy management system to dynamically handle the application and removal of the policy on the right computer system.

Layer 8: Release and Enactment

This layer is where it is specified that a policy is to be applied at a given time/date (e.g., on April 4 at 6 AM) and possibly provides an expiration date. Although similar to the effective schedule, release and enactment schedule serves a different purpose. This layer focuses on release management driven from the central administration, while the effective schedules are interpreted locally by the policy engine and may stay in effect indefinitely. Release management provides rich administrative functionality, including version management, audit logs, rollback and complex release policy. For example, if applying a new policy requires a reboot and hence a service interruption, this meta-policy may specify a maintenance window. Common release policy for patching is, for example, "apply the change any time from February 20-February 25, but ask the user for permission; if the change has not be made by midnight on February 25, then force it at the first opportunity thereafter."

Layers 3-8 comprise the policy-delivery sub-infrastructure of at least one implementation of the overall the policy-management infrastructure. This includes scheduling and targeting as well as efficient and effective transport for large payloads. This distributed service has components both in the fabric and on the managed node. On the managed node this sub-infrastructure handles applicability and adaptation as well as policy merging (RSOP). The delivery service stores the policy on the managed node, and hands the policy over to the policy consumer in whatever form the consumer wants. In one or more implementations, this delivery service will handle services that are not running when a policy arrives, notification of change to apps, restart, and other exception situations.

Layer 9: Change and Approval Workflow

This meta-policy defines the workflow for defining, reviewing, approving and deploying policy changes. For example, this meta-policy identifies, for example, who can approve a policy change based on scope, target, impact, problem domain. It may also identify, for example, who else approves if the primary approver is unavailable. It may also identify, for example, what type of impact and conflict analysis is required.

Within the policy-management infrastructure, this meta-policy layer manages the life-cycle of policies. Management at this layer relies on the configuration management database (CMDB) and the workflows that involve humans. A CMDB is a database that contains all relevant information about the computing components in a system or enterprise and the relationships between those components.

Other Layer Ordering

A data-layer ordering of the meta-policies in this policy-management infrastructure provides a valuable advantage in defining the relationships of the various meta-policies (especially in the case of conflict resolution). However, what is presented above is just the ordering of one implementation of the policy-management infrastructure. Depending on the given circumstances, other ordering of the meta-policies may be desirable.

For example, many policy engines are fully capable of processing the effective schedule and conditions and merge and conflict resolution meta-policies. This could justify rearranging the layers. However, it may still be desirable to include these functions as part of the general infrastructure? By implementing this logic in the infrastructure, logic may be added to a policy consumer that lacks this capability. For example, a registry and a firewall might not understand effective schedules The policy infrastructure can apply different firewall policies for working and non-working hours.

But for policy engines that do support it, it may be desirable to have a different arrangement of layers where layers 3 and 4 are moved below the management layer (i.e., layer 2) and into the "policy consumer" classification. In practice, this may be accomplished by having schedule and merge meta-policy that just pass all the policies down.

Supporting Common Namespaces

As depicted, the policy management data model 100 also includes the associated supporting common namespaces 120. Examples of such namespaces include schedule, directory services, system definition model (SDM), and namespaces used by resource managers. As used herein, common namespaces provides a common context shared by many (or all) of the policies and thus all of the meta-policies.

Schedules

Schedules are used for many purposes in a policy system (and elsewhere). For schedules, this policy-management infrastructure defines a common schema, common services and common store for schemas. The following are examples of such definitions:

Effective schedules allow a policy to say, for example, "Bob can access these files during working hours" or "this machine may be taken out of service between 3 and 4 AM on Saturdays" or "during main trading hours this service should respond in less than 3 seconds for 95% of requests."

Release and enactment schedules say, for example, "this policy goes into effect on May 1."

Delivery schedules say, for example, "this policy should be delivered before 8 AM May 1, should be offered to the user for approval, and should be forced installed by 8 PM May 5"

Monitoring schedules say, for example, "validate compliance with this policy on network logon, after USB device plug-in, or 3 AM every day."

Period schedules define time periods, essentially a Boolean function over the time line, such as "9-5 every Mon-Fri except Holidays" or "the last working day of the quarter" The basic function offered by a schedule service is "is this point in time included in this schedule?" Schedules can be composed in different ways: union, intersection, etc. Even though the schedule is based on time periods, a service can fire notification events around the schedule.

Event schedules define a pattern of events, such as "every day at 3 AM," "on network logon," "after USB device plug-in" or "after 3 failed login attempts." Event schedules can be combined only as a union, although an event schedule can be intersected with a period schedule. There may be some advanced functions that include jitter: "9 AM with a delay of RAND(15 min)."

The latter two schedules (periodic and event schedules) in the above list have very different schemas and semantics. With this policy-management infrastructure, the schema allows composition through reference.

Directory Services

Many policy functions reference identities of users, computer systems, organizational units and other entities that are typically maintained in directory services. A directory service provides a naming structure and an application programming interface that provides certain navigation and querying functions, and these functions may be based on industry-wide standards or may be proprietary. Policies and meta-policies can reference entities in this directory, and the policy management infrastructure resolves the reference at the time when it is needed. For example, if a policy is targeted to an administrative group such as an OU in a standard directory structure, the directory can provide the list of the systems included in that OU and thus enables the policy infrastructure to deduce the system targeting implied by the administrative group targeting.

System Definition Model

Figure 2:
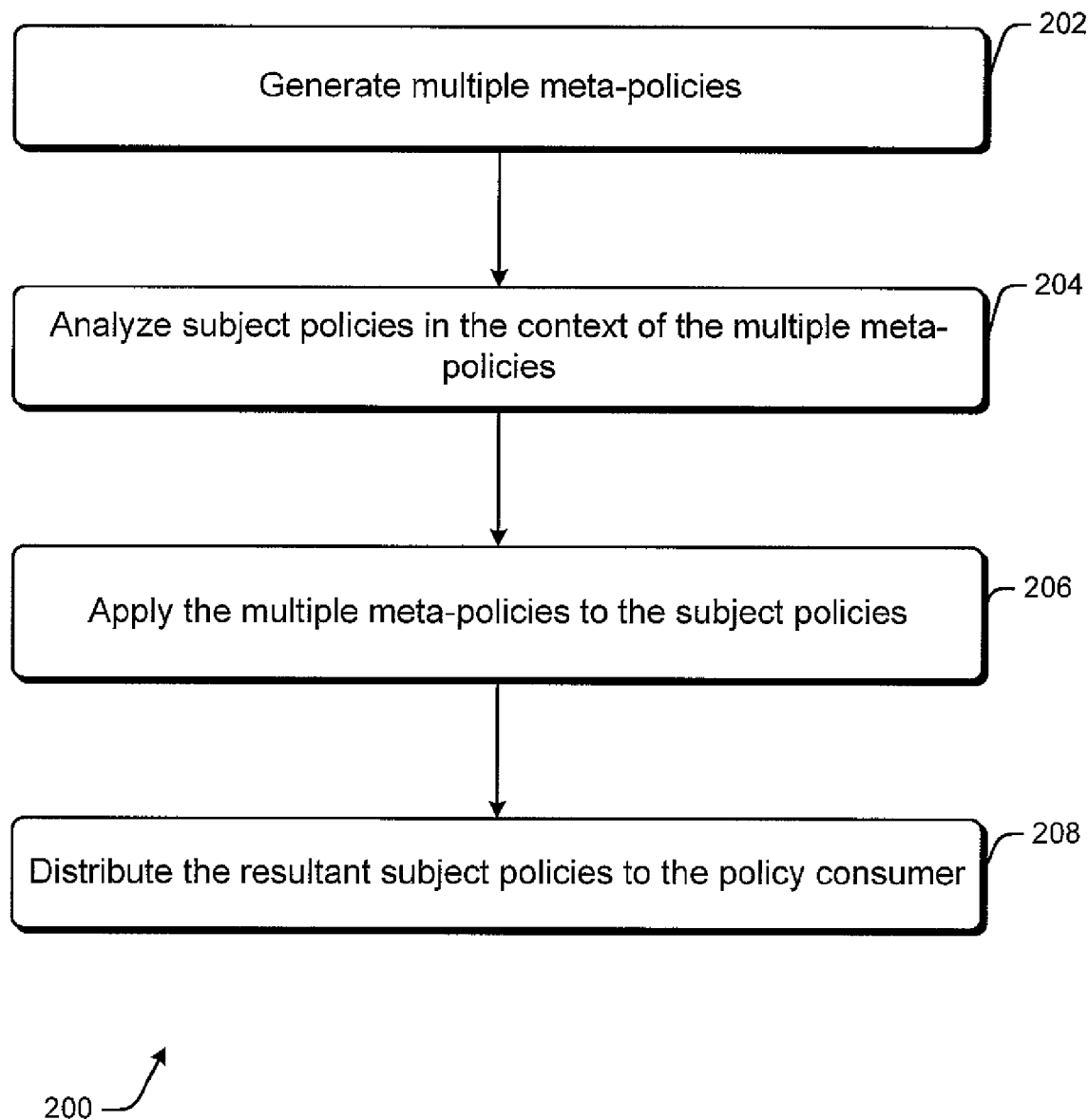
FIG. 2 is flowchart of a methodological implementation described herein.

The managed system is described by a model, defined in the System Definition Model (SDM). The model describes the components of a system and their relationships, both general types and actual instances. Typically, there are two flavors of the model: the Current State ("is-ness") and the Desired State ("ought-ness"). In other models, there are other flavors including history, predicted loads and states, proposed and what-if versions. The model may include role definitions used for access control. Models also include resources; name patterns for resources (such as *.tmp) are expressed as defined by each resource manager Resource Managers A resource manager is a service that manages resources that are often the subject of policies. Each resource manager has its own characteristics and namespace. The policy may refer to the resources. For example, a file system is a resource manager that manages files, and these files are identified through a name pattern that typically includes a hierarchical directory structure, file names and extensions that designate types; each file has additional attributes such as the size and the date last modified. A relational database, such as Microsoft's SQL Server, is also a resource manager that manages tables, indexes, procedures and other resources, and these resources are identified with a different naming structure and have different properties. The naming structure of the resource manager is significant for the specification of policies and meta-polices. For example, a policy or meta-policy that references files in a conventional file system can use the expression '*.doc' to indicate all files of the type Word documents, but such an expression would not be valid for a SQL Server resource manager Methodological Implementation FIG. 2 shows method 200 for policy management in the context of the policy-management infrastructure 100. This method 200 is performed by the one or more of the various components as depicted in FIG. 1. Furthermore, this method 200 may be performed in software, hardware, firmware, or a combination thereof.

At block 202 of FIG. 2, the policy-management system 110 generates multiple meta-policies, wherein a meta-policy controls the application of policies to one or more target computing nodes. When generating the meta-policies, the system organizes them in layers. In at least one implementation, the meta-policy layers are organized in a manner as shown in the policy-management infrastructure 100 shown in FIG. 1 and described above.

At block 204 of FIG. 2, the policy-management system 110 analyzes the data of multiple actual policies in the context of the layered multiple meta-policies. In doing so, the system determines the existence and location of "overlap" and "conflicts" with policies. An "overlap" occurs when two or more policies in the same policy domain refer to the same object and are in effect at the same time on the same computer system under the same conditions. For example, if one policy is targeted to all computer systems in the corporate domain and is in effect during working hours, and another policy is targeted to the same computer systems and is in effect at all times, these two policies overlap. Conversely, if one policy is in effect during working hours and another during non-working hours, they do not overlap.

The system does not need to know the domain-specific details of a policy in order to locate an overlap, it is determined entirely through analyzing the meta-policies and resource manager namespaces. A "conflict" is when two policies overlap and make conflicting statements. For example, if one policy says that the firewall should be down during working hours, and another policy says that the firewall should be up at all times, those policies conflict. Conversely, if one policy says the firewall should be up during working hours and another says the policy should be up at all times, those policies do not conflict even though they do overlap.

The system does need to know the domain-specific details to locate a conflict, since the conflict is determined by the meaning of the policy. For example, firewall up and firewall down are easily determined to be conflicting since the firewall setting is a Boolean with two mutually exclusive values, but if one policy says that Bob has read access to a file and another overlapping policy says that Bob has full access to a file, those policies are not in conflict because "full" access includes "read" access, and that can be determined only by a system that understands the semantics of file system access, which analysis is specific to the access control policy domain. Because of this, conflict analysis and detection may be implemented through a general-purpose overlap detection system that looks only at the domain agnostic meta-policies, and after overlap has been identified a domain-specific conflict analysis system can determine if the overlapping policies do in fact conflict.

The policies and meta-policies can also be analyzed for completeness of coverage. For example, if one policy is in effect during working hours and another policy is in effect during non-working hours, those two policies between them provide complete coverage. Conversely, if one policy applies to all files that match the name pattern "*.doc" and another policy applies to all files that match the name pattern "*.xls" those two policies do not provide complete coverage of the file system, since files exist that do not match either of those two name patterns. Coverage detection is similar to overlap detection in that it does not require understanding of domain-specific policy details, it is done only through analysis of the meta-policies and the resource manager namespaces.

At block 206 of FIG. 2, the system applies the multiple meta-policies to actual policies. In doing so, the system facilitates the computation of the Resultant Set of Policies (RSOP) when conflicts and/or overlaps are determined to exist. The system utilizes the layering of the data in the ordered and ranked layers of the policy-management infrastructure 100 (as shown in FIG. 1 and described above) to determine effect of the policies.

The RSOP computation facilitation performed by the system may include actually RSOP calculation itself or, alternatively, the system may send the targeted policies to the policy consumer for the policy consumer to do the resultant RSOP calculation.

At block 208 of FIG. 2, the policy-management system 110 distributes the resultant policies to the policy consumer, which policy consumer is configured to apply at least one of the processed policies to one or more target computing nodes. The policy consumer may map processed policies to the domain-specific details of the policy consumer Afterword The techniques, described herein, may be implemented in many ways, including (but not limited to) program modules, general- and special-purpose computing systems, network servers and equipment, dedicated electronics and hardware, firmware, as part of one or more computer networks, or a combination thereof. Furthermore, other implementations may employ well-known computing systems, environments, and/or configurations that are suitable for use, such as (by way of example and not limitation): personal computers (PCs), server computers, hand-held or laptop devices, multi-processor systems, microprocessor-based systems, programmable consumer electronics, wireless phones and equipments, general- and special-purpose appliances, application-specific integrated circuits (ASICs), network PCs, thin clients, thick clients, set-top boxes, minicomputers, mainframe computers, distributed computing environments that include any of the above systems or devices, and any combination of the like.

Although the one or more above-described implementations have been described in language specific to structural features and/or methodological steps, it is to be understood that other implementations may be practiced without the specific exemplary features or steps described herein. Rather, the specific exemplary features and steps are disclosed as preferred forms of one or more implementations. In some instances, well-known features may have been omitted or simplified to clarify the description of the exemplary implementations. Furthermore, for ease of understanding, certain method steps are delineated as separate steps; however, these separately delineated steps should not be construed as necessarily order dependent in their performance.

The invention claimed is:

1. One or more processor-readable memory having processor-executable instructions that, when executed by a processor, perform a method comprising:
   generating multiple meta-policies that are organized into a meta-policy layered hierarchy such that an application of a higher layered meta-policy to one or more objects limits corresponding effects of one or more lower layered meta-policies that are subordinate to the higher layered meta-policy on the one or more objects, wherein each meta-policy controls an application of policies to one or more target computing nodes;
   utilizing common namespaces to provide a common context shared by the policies and meta-policies, each of the common namespaces being defined by a corresponding file extension;
   analyzing the policies in the context of the meta-policies for the common namespaces to determine one or more overlaps of the policies without knowledge of domain-specific details of each policy, each overlapping occurring when a plurality of policies within a policy domain are in effect at a same time for one or more identical objects on an identical computer system;
   analyzing the policies in the context of the meta-policies for the common namespaces without knowledge of the domain specific details of each policy to determine a completeness of the policies in covering a plurality of objects using the common namespaces;
   determining one or more conflicts in the one or more overlaps of the policies based on domain-specific details of each policy, each conflict occurring when a plurality of overlapping policies make conflicting policy statements regarding the one or more identical objects; and
   computing a resultant set of policies (RSOP) for at least one of the one or more overlaps or one or more conflicts by applying the multiple meta-policies to the policies.

2. One or more memory as recited in claim 1, further comprises distributing the RSOP for the one or more target computing nodes to a policy consumer.

3. One or more memory as recited in claim 1, wherein the generating comprises producing a multi-layered data model representing the multiple meta-policies.

4. One or more memory as recited in claim 1, wherein the computing includes determining an effect of the multiple meta-policies on the policies.

5. One or more memory as recited in claim 1, wherein the computing comprises transmitting the policies to a policy consumer, thereby enabling the policy consumer to calculate, at least in part, the RSOP.

6. One or more memory as recited in claim 1, wherein the plurality of objects include files in a file system that use the common namespaces.

7. One or more memory as recited in claim 1, wherein the multiple meta-policies and the policies utilize a common namespace for scheduling, directory services, system definition model, or a combination thereof.

8. One or more memory as recited in claim 1, wherein the multiple meta-policies and the policies utilize a common namespace which is used by one or more resource managers.

9. One or more memory as recited in claim 1, wherein the generating comprises producing a data model representing the multiple meta-policies, the data model having at least two multiple data layers comprising a management layer and a merge and conflict layer.

10. One or more processor-readable memory having processor-executable instructions that, when executed by a processor, perform a method comprising:
   generating multiple meta-policies, wherein a meta-policy controls an application of policies to one or more target computing nodes, the generating comprising producing a data model representing the multiple meta-policies, the data model having the following multiple data layers arranged in a hierarchy of highest to lowest layers, in which a higher layer limits effect of a lower layer on the one or more target computing nodes:
      an applicability and adaptation meta-policy layer to store data regarding applicability and adaptation of policies, the applicability and adaptation meta-policy layer at least activates a previous inactive policy of the policies to adapt to an installation of a new hardware device on a target computing node;
      a consistency meta-policy layer that is directly under the applicability and adaption meta-policy layer to store data regarding consistency of policies;
      a targeting and distribution meta-policy layer that is directly under the consistency meta-policy layer to store data regarding targeting and distribution policies;

a release and enactment meta-policy layer that is directly under the targeting and distribution meta-policy layer to store data regarding delivery of policies, the release and enactment meta-policy layer at least specifies a time window for prompting a user to apply a policy to a target computing node, and that the policy is to be applied without input from the user upon expiration of the time window;

a change and approval workflow meta-policy layer that is directly under the release and enactment meta-policy layer to store data regarding life cycles of policies;

utilizing common namespaces to provide a common context shared by the policies and meta-policies;

analyzing policies in the context of the meta-policies and the common namespaces to determine one or more overlaps of the policies, each overlapping occurring when a plurality of policies within a policy domain are in effect at a same time for one or more identical objects on an identical computer system;

determining one or more conflicts in the one or more overlaps of the policies, each conflict occurring when a plurality of overlapping policies make conflicting policy statements regarding the one or more identical objects;

and computing a resultant set of policies (RSOP) for at least one of the one or more overlaps or one or more conflicts by applying the multiple meta-policies to the policies.

11. One or more processor-readable memory of claim 10, wherein the consistency meta-policy layer at least specifies that at least two of the policies are to be simultaneously deployed as an atomic unit on a target computing node to prevent an generation of an inconsistent state on the target computing node.

12. One or more processor-readable memory of claim 10, wherein the targeting and distribution meta-policy layer at least prohibits a target computing node from downloading a software package over a network when the target computing node is roaming away from a designated location.

13. One or more processor-readable memory of claim 10, wherein the change and approval workflow meta-policy layer at least identifies a primary approver and a secondary approver for a change to at least one of the policies.

14. A computer-implemented policy-management method comprising:

generating, by one or more computing devices configured to implement policy management, multiple meta-policies, wherein a meta-policy controls an application of policies to one or more target computing nodes;

organizing the multiple meta-policies into a meta-policy hierarchy such that an application of a higher meta-policy to one or more objects limits corresponding effects of one or more lower meta-policies that are subordinate to the higher meta-policy on the one or more objects, wherein each meta-policy controls the application of policies to one or more target computing nodes;

utilizing a common namespace to provide a common context shared by the policies and meta-policies, the common namespace being defined by a file extension of files that are affected by the meta-policies and the policies;

analyzing, by the one or more computing devices, the meta-policies for the common namespace to determine one or more overlaps of the policies without knowledge of domain-specific details of each policy, each overlapping occurring when a plurality of policies within a policy domain are in effect at a same time for one or more identical objects on an identical computer system;

determining, by one or more computing devices one or more conflicts in the one or more overlaps of the policies based on domain-specific details of each policy, each conflict occurring when a plurality of overlapping policies make conflicting policy statements regarding the one or more identical objects;

computing, by the one or more computing devices, a resultant set of policies (RSOP) for at least one of the one or more overlaps or one or more conflicts by applying the multiple meta-policies to the policies; and distributing, by the one or more computing devices, the RSOP for the one or more target computing nodes to a policy consumer.

15. A method as recited in claim 14, wherein the computing includes determining the effect of the multiple meta-policies on the policies.

16. A method as recited in claim 14, wherein the computing comprises transmitting the policies to a policy consumer, thereby enabling the policy consumer to calculate, at least in part, the RSOP.

17. A method as recited in claim 14, wherein the common namespace is used by one or more resource managers.

18. A method as recited in claim 14, wherein the multiple meta-policies and the policies utilize the common namespace for scheduling, directory services, system definition model, or a combination thereof.

19. A method as recited in claim 14, further comprising providing installation services to analyze the common namespace for overlap and coverage.

20. A method as recited in claim 14, wherein the data model has at least two of the following multiple data layers:

a policy management meta-policy layer to store data regarding policy management;

a merge and conflict-resolution meta-policy layer to store data concerning policy merging and conflict resolution;

an effective schedule and conditions meta-policy layer to store data defining effective schedule and conditions for policies;

an applicability and adaptation meta-policy layer to store data regarding applicability and adaptation of policies;

a consistency meta-policy layer to store data regarding consistency of policies;

a targeting and distribution meta-policy layer to store data regarding targeting and distribution policies;

a release and enactment meta-policy layer to store data regarding delivery of policies;

a change and approval workflow meta-policy layer to store data regarding life cycles of policies.

\* \* \* \* \*